United States Patent
Pi et al.

(10) Patent No.: US 11,924,227 B2
(45) Date of Patent: Mar. 5, 2024

(54) HYBRID UNSUPERVISED MACHINE LEARNING FRAMEWORK FOR INDUSTRIAL CONTROL SYSTEM INTRUSION DETECTION

(71) Applicants: Siemens Aktiengesellschaft, Munich (DE); Rutgers University, New Brunswick, NJ (US)

(72) Inventors: Jiaxing Pi, Weehawken, NJ (US); Dong Wei, Edison, NJ (US); Leandro Pfleger de Aguiar, Robbinsville, NJ (US); Honggang Wang, Edison, NJ (US); Saman Zonouz, Edison, NJ (US)

(73) Assignees: SIEMENS AKTIENGESELLSCHAFT, Munich (DE); Rutgers University, New Brunswick, NJ (US)

( * ) Notice: Subject to any disclaimer, the term of this patent is extended or adjusted under 35 U.S.C. 154(b) by 521 days.

(21) Appl. No.: 17/259,010

(22) PCT Filed: Jun. 18, 2019

(86) PCT No.: PCT/US2019/037600
§ 371 (c)(1),
(2) Date: Jan. 8, 2021

(87) PCT Pub. No.: WO2020/013958
PCT Pub. Date: Jan. 16, 2020

(65) Prior Publication Data
US 2021/0306356 A1  Sep. 30, 2021

Related U.S. Application Data

(60) Provisional application No. 62/695,873, filed on Jul. 10, 2018.

(51) Int. Cl.
*H04L 9/40* (2022.01)

(52) U.S. Cl.
CPC ...... *H04L 63/1416* (2013.01); *H04L 63/1425* (2013.01); *H04L 63/1466* (2013.01)

(58) Field of Classification Search
CPC ............ H04L 63/1416; H04L 63/1425; H04L 63/1466
See application file for complete search history.

(56) References Cited

U.S. PATENT DOCUMENTS

| | | | |
|---|---|---|---|
| 9,843,594 B1 | 12/2017 | Evans et al. | |
| 2013/0274898 A1 | 10/2013 | Thatikonda et al. | |

(Continued)

FOREIGN PATENT DOCUMENTS

| | | |
|---|---|---|
| CN | 106502234 A | 3/2017 |
| CN | 108093406 A | 5/2018 |

(Continued)

OTHER PUBLICATIONS

PCT International Search Report and Written Opinion of International Searching Authority dated Sep. 16, 2019 corresponding to PCT International Application No. PCT/US2019/037600 filed Jun. 18, 2019.

(Continued)

*Primary Examiner* — Nelson S. Giddins

(57) ABSTRACT

A system for monitoring an industrial system for cyberattacks includes an industrial control system including a plurality of actuators, a plurality of sensors each arranged to measure one of a plurality of operating parameters, and an edge device and a computer including a data storage device having stored thereon a program that includes each of a time-series database including expected operating ranges for each operating parameter, a clustering-based database that includes clusters of operating parameters having similarities, (Continued)

and a correlation database that includes pairs of operating parameters that show a correlation. An alarm system is operable to initiate an alarm in response to current operating data including a measurement from one of the plurality of sensors falling outside of an expected range, a change in the expected clustering of one of the plurality of sensors based on the current operating data from each of the plurality of sensors, and a variation in the current operating data between two of the plurality of sensors that falls outside of an expected correlation of the two of the plurality of sensors.

20 Claims, 3 Drawing Sheets

(56) References Cited

U.S. PATENT DOCUMENTS

| | | | |
|---|---|---|---|
| 2016/0330225 A1 | 11/2016 | Kroyzer et al. | |
| 2017/0230410 A1* | 8/2017 | Hassanzadeh | G06N 20/00 |
| 2017/0323389 A1* | 11/2017 | Vavrasek | G06Q 40/08 |
| 2018/0191758 A1 | 7/2018 | Abbaszadeh et al. | |
| 2019/0204818 A1* | 7/2019 | Ogata | G05B 23/0283 |

FOREIGN PATENT DOCUMENTS

| | | |
|---|---|---|
| WO | 2015/104691 A2 | 7/2015 |
| WO | 2017072356 A1 | 5/2017 |

OTHER PUBLICATIONS

Chen Gang et al.; "Study on Data Mining Based Intrusion Detection for Network"; Process Automation Instrumentation No. 06; Jul. 20, 2006 (Jul. 20, 2006).

Zhang Renbin et al: "Industry anomaly data detection based on Kmeans clustering", Application Research of Computers, vol. 35 No. 7, doi: 10, 3969 /j, issn, 1001-3695, 2018, 07, 063, p. 2180-2184, Jul. 31, 2018.

* cited by examiner

HYBRID UNSUPERVISED MACHINE LEARNING FRAMEWORK FOR INDUSTRIAL CONTROL SYSTEM INTRUSION DETECTION

TECHNICAL FIELD

The present disclosure is directed, in general, to a system and method for detecting cyberattacks, and more specifically to such a system and method applicable to complex industrial control systems.

BACKGROUND

Industrial Control System (ICS) are used to control operations in the manufacturing industry, power generation industry, and other critical infrastructures, including electric power transmission and distribution, oil and natural gas production, refinery operations, water treatment systems, wastewater collection systems, and pipeline transport systems. Industrial control systems can be very complex including dozens if not hundreds of different components.

The critical role of ICSs make them valuable targets for cyberattacks that may aim to interfere with any of these systems.

SUMMARY

A method of protecting an industrial system from cyberattacks includes collecting initial operating data from a plurality of sensors each positioned within the industrial system and operable to monitor an operating parameter of the industrial system. The method also includes analyzing the initial operating data to develop a program that includes a time-series database including expected operating ranges for each operating parameter, a clustering-based database that includes clusters of operating parameters having similarities, and a correlation database that includes pairs of operating parameters that show a correlation in their initial operating data. The method further includes operating the program including the time-series database, the clustering-based database, and the correlation database in a computer, the program operable to receive current operating data and to analyze that operating data in view of each of the time-series database, the clustering-based database, and the correlation database. The method also includes triggering an alarm in response to the analysis of the current operating data indicating at least one of an operating parameter outside of an expected range, a change in the expected clustering, and a variation in a correlation.

In another construction, a system for monitoring an industrial system for cyberattacks includes an industrial control system including a plurality of actuators, a plurality of sensors each arranged to measure one of a plurality of operating parameters, and an edge device and a computer including a data storage device having stored thereon a program that includes each of a time-series database including expected operating ranges for each operating parameter, a clustering-based database that includes clusters of operating parameters having similarities, and a correlation database that includes pairs of operating parameters that show a correlation. An alarm system is operable to initiate an alarm in response to current operating data including a measurement from one of the plurality of sensors falling outside of an expected range, a change in the expected clustering of one of the plurality of sensors based on the current operating data from each of the plurality of sensors, and a variation in the current operating data between two of the plurality of sensors that falls outside of an expected correlation of the two of the plurality of sensors.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
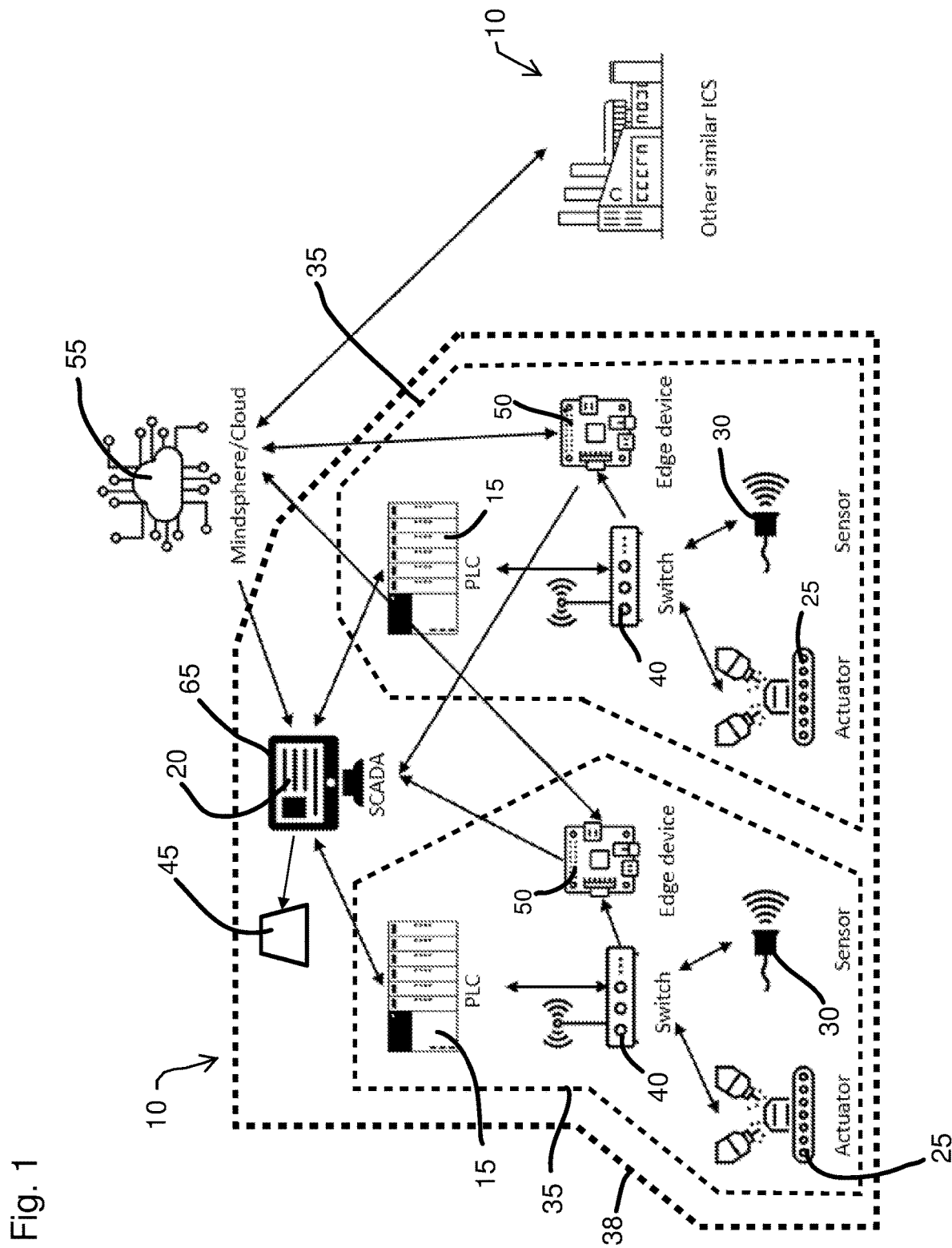
FIG. 1 is a schematic illustration of two industrial control systems that communicate with an external data storage device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of twenty percent would fall within the meaning of these terms unless otherwise stated.

Industrial Control Systems (ICSs) 10, such as the one illustrated in FIG. 1 typically include interconnected embedded systems, such as programmable logic controllers (PLCs) 15, distributed control systems (DCS), supervisory control and data acquisition systems (SCADA) 20, actuators 25, sensors 30, communication devices, data storage devices, memory devices, human interface devices, and the like. Other industrial control systems 10 may include building automation controllers, roadside/railroadside traffic controllers, energy automation controllers, etc. In a distributed ICS 10, multiple controllers jointly control one or more physical processes or physical environments 35 of an industrial system 38. FIG. 1 illustrates the control elements of the physical environments 35 and the industrial system 38 but omit the actual process equipment. Using a series of sensors 30, actuators 25, switches 40, controllers, etc. users or other controllers can monitor the states of the various physical systems 35 and control the systems 35 to react to the detected state. In addition, the ICS 10 includes one or more alarm systems 45 that may provide audio or visual alarms for a user. In addition, a data logging system may be provided to log the various alarms for later review and study.

Before proceeding, it should be noted that sensors 30 includes any device capable of measuring a parameter. For example, thermocouples or other temperature measuring devices are sensors 30 that measure temperature. Pressure sensors 30 can measure and transmit data regarding pressures. Other sensors 30 can measure flow rates, velocities, positions, orientations, counts, density, viscosity, chemical composition, voltage, resistance, current plow, power, power factor, states, etc. The number, type, and function of sensors 30 is extensive. As such, the term "sensor" should be broadly read to include any device that measures or determines a parameter.

ICSs 10 may include one or more edge devices 50 that are arranged to collect data from various sensors 30 or other devices. In some constructions, the ICSs 10 act as edge devices (e.g., Mindsphere enabled PLC with MindConnect as provided by Siemens AG.). Each edge device 50 may be connected to a data bus or field bus that collects the data from the sensors 30 associated with the particular edge device 50. The edge devices 50 also provide for communication between the ICSs 10 and a data storage system 55 where the data is stored. Common edge devices 50 include but are not limited to routers, routing switches, integrated access devices, multiplexers, and a variety of metropolitan area network and wide area network access devices.

Large distributed ICSs 10, such as the one illustrated in FIG. 1 often include or operate in conjunction with a centralized monitoring system (e.g., SCADA) 20. The ICS 10 comprises networked controllers (PLCs 15 and/or DCS) that jointly or individually control a physical process 35, where the actions of the individual controllers 15 are partially interdependent. In particular, actions initiated by one controller 15 may change the system state which will be represented in the sensor readings of other controllers 15. This means, all the controllers 15 are indirectly connected with each other through the physical dynamics of the controlled physical system 38. The centralized monitoring system 20 then controls the networked controllers 15 as the high-level ICS controller.

FIG. 1 illustrates two distributed ICSs 10 with one shown in detail. The detailed ICS 10 includes two network controllers in the form of PLCs 15 that each control a separate physical process 35. Within each physical process 35, the PLC 15 communicates with switches 40, edge devices 50, sensors 30, actuators 25, and the like to control the physical process 35. Each of the PLCs 15 also communicates with the high-level ICS controller in the form of the SCADA controller 20. The SCADA controller 20 and the edge devices 50 may communicate with a cloud data storage system such as Mindsphere, another cloud-based system, a local or remote data storage device or any other suitable data storage device 55 as may be desired. The second ICS 10 also communicates with the desired data storage device 55 and includes components similar to those described with regard to the first ICS 10.

In one construction of the ICS 10, an industrial system 38 in the form of a power plant includes several operating units that each provide electricity to a switchyard that then connects to a utility grid or network. A DCS or PLC 15 system may be provided to operate each of the operating units with a separate PLC 15 operating a boiler, or fuel supply system with one or more SCADA systems 20 monitoring or controlling the units themselves. Yet another DCS or PLC 15 may be involved in controlling the switchyard. Finally, the utility may have an overriding control system that interfaces with the switchyard DCS or PLC 15 and the Plant SCADA system 20. Thus, while changes in the various control systems can affect the other components, it is not a direct affect. For example, the utility control system could request an increase in power from the SCADA system 20, but it could not directly move a control valve for any of the operating units. The SCADA system 20 would be left to decide how to deliver the additional power.

A detection system 60 (shown in FIG. 2) provides a systematic framework to detect ICS misbehavior that may be caused by a cyberattack or other unauthorized access and also provides interpretable alarm messages to the operators. Typical malicious events can include unauthorized alteration of control commands/settings sent to physical devices (actuators 25) that can change the state of the physical process 35 as well as other undesirable attacks that can cause improper operation of the components or the various systems. A cyberattack can compromise one (or a small subset) of controllers in a distributed ICS 10. For instance, in a geographically distributed ICS 10, the cyberattacker might have physical access to some controllers in a remote location of the plant, via public communication media.

A cyberattacker can gain control over a controller leveraging static or dynamic attack techniques. In a static attack the cyberattacker replaces the software (firmware or control logic) of the controller, e.g., via a malicious software update or overwriting control application programs. Dynamic attacks are based on injecting new code at run-time, thereby manipulating the behavior of existing code through return-oriented programming, or data-oriented programming.

Two main types of intrusion detection methods have been historically used in information technology (IT) security. Signature based intrusion detection systems focus on extracting "bad patterns" from previous attacks and detect similar attacks in the future. Behavioral or anomaly-based intrusion detection systems focus on detecting deviations from a well-known baseline of selected and monitored key performance indicators (KPIs). Typical monitored KPIs may include traffic volume in kbps, traffic direction, and typical connection origin/destination, and the like. In addition, IT might also include data observed at the application layer of the OSI stack for the industrial protocol in use. IT security solutions have been adapted to ICSs 10 and could be used to detect some common attacks, such as data spoofing and the like. However, unlike IT systems, ICSs 10 have a direct impact on, and receive feedback from the physical world. Many sophisticated ICS attacks aim at sabotaging the critical infrastructure by altering the process variables while maintaining the normal behavior in the cyber system. Such attacks cannot be directly detected by the traditional IT security solutions.

Machine learning approaches can improve the ability to detect cyberattacks in industrial systems 38 by adding the ability to detect deviations on values observed from process variables/IO (e.g., sensors 30, actuator values, etc.). Such systems are generally categorized as supervised and unsupervised.

Supervised systems or methods assume that a human expert can mark a sample data as "normal" or "attack". The methods then can extract patterns for both classes. Such methods can be extended to multi-class scenarios and can identify the type of attack if the training dataset contains enough information. However, the human expert cannot always mark a sample data as "normal" or "attack" such that these methods cannot detect attacks that are unseen in the training samples or that are unknown at the time of training.

Unsupervised methods don't need the label information during the training process. One category of such methods assumes that anomalous events are rare in the training process and that they significantly deviate from most of the data. However, in real production it is common that the system doesn't have access to any attack data during training. Therefore, another category establishes a baseline model according to time series patterns or one class-based methods. Due to the diversity of data samples, one class-based methods tend to generate a high rate of false alarms or false positives.

Figure 2:
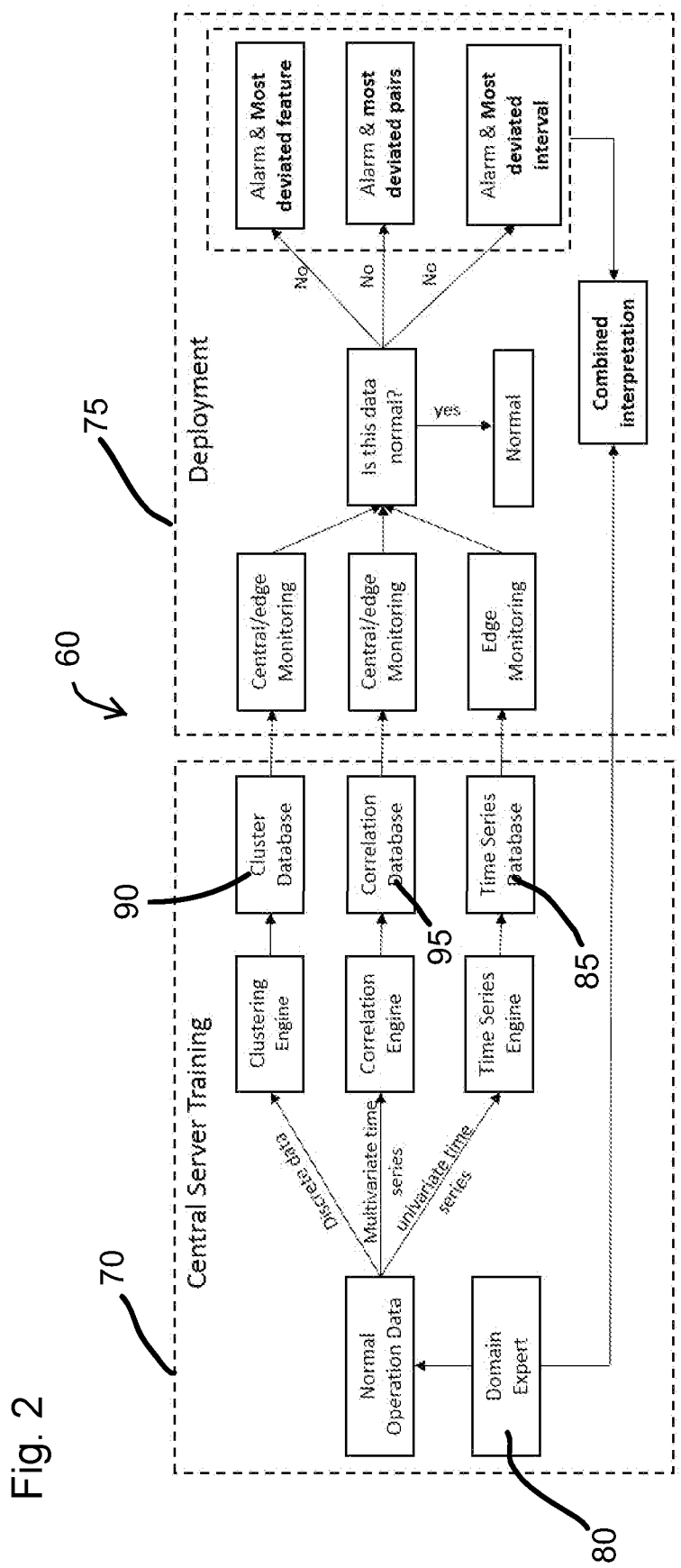
FIG. 2 is a schematic illustration of the algorithm training and operation of a program from monitoring the industrial control system of FIG. 1.

To solve the above-mentioned challenges, the hybrid unsupervised machine learning detection system or method 60, such as the one illustrated in FIG. 2 can be used to monitor the process variables in ICSs 10. The process variables are typically collected from the sensors 30 in the field bus or using a Human-Machine Interface (HMI). The hybrid system 60 of FIG. 2 includes a combination of three unsupervised machine learning models and monitors the process variables from three different aspects. A combination of models from different aspects of process variable monitoring reduces the high false alarm rate by validating the results from multiple outputs using the different models.

Figure 3:
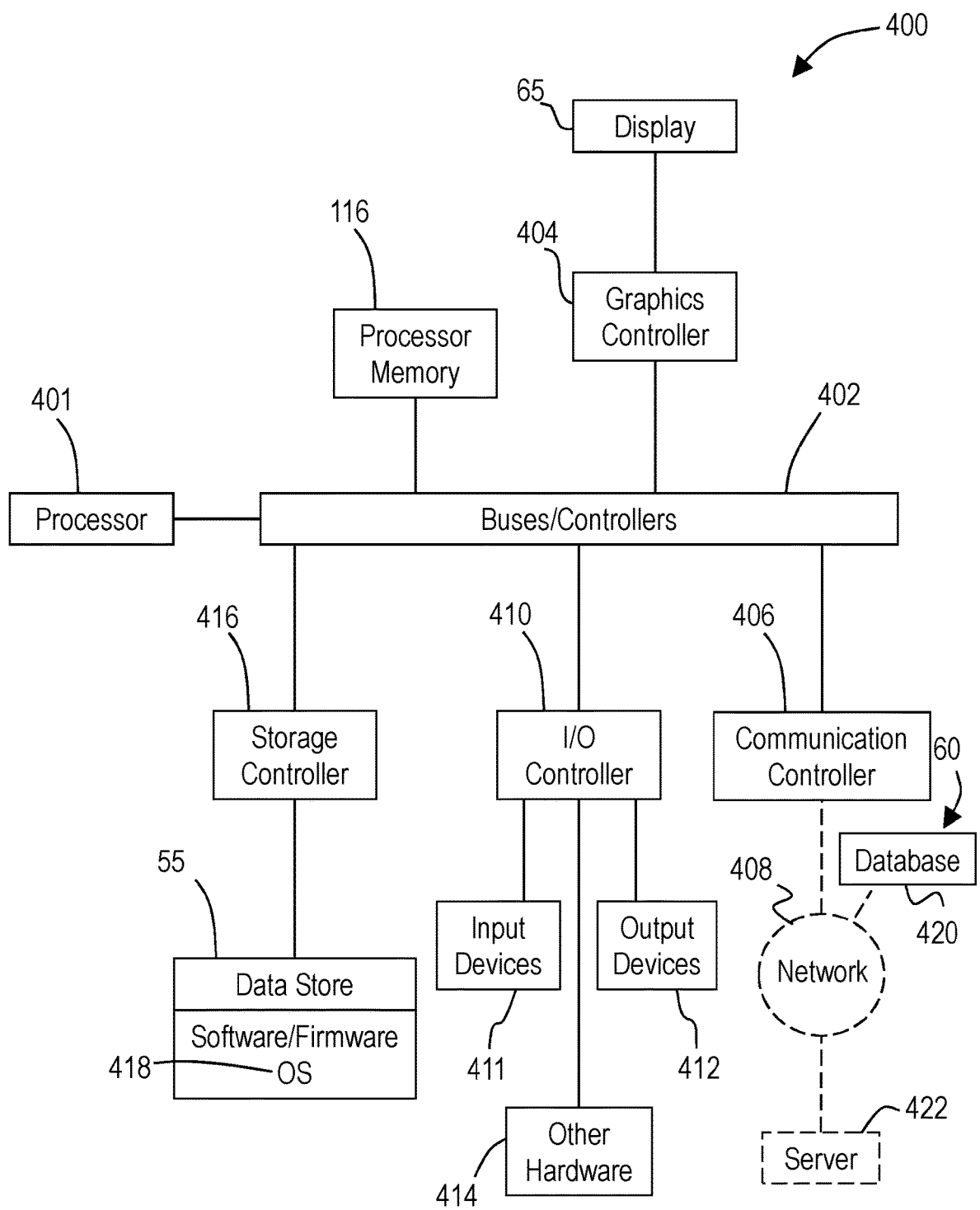
FIG. 3 is a schematic illustration of a computer system.

As will be discussed, the system 60 of FIG. 2 can be implemented in a computer or other data processing system 400. FIG. 3 illustrates an example of one such data processing system 400 with which one or more embodiments of the hybrid systems 60 described herein may be implemented. For example, in some embodiments, the at least one processor 401 (e.g., a CPU) may be connected to one or more bridges/controllers/buses 402 (e.g., a north bridge, a south bridge). One of the buses for example, may include one or more I/O buses such as a PCI Express bus. Also connected to various buses in the depicted example may include the processor memory 116 (e.g., RAM) and a graphics controller 404. The graphics controller 404 may generate a video signal that drives a display device 65. It should also be noted that the processor 401 in the form of a CPU may include a memory therein such as a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 406 (Ethernet controllers, WiFi controllers, cellular controllers) operative to connect to a network 408 such as a local area network (LAN), Wide Area Network (WAN), the Internet, a cellular network, and/or any other wired or wireless networks or communication equipment.

Further components connected to various busses may include one or more I/O controllers 410 such as USB controllers, Bluetooth controllers, and/or dedicated audio controllers (connected to speakers and/or microphones). It should also be appreciated that various peripherals may be connected to the I/O controller(s) (via various ports and connections) including the input devices 411, output devices 412 (e.g., printers, speakers) or any other type of device that is operative to provide inputs to and/or receive outputs from the data processing system.

Also, it should be appreciated that many devices referred to as input devices or output devices may both provide inputs and receive outputs of communications with the data processing system. For example, the processor 401 may be integrated into a housing (such as a tablet) that includes a touch screen that serves as both an input and display device. Further, it should be appreciated that some input devices (such as a laptop) may include a plurality of different types of input devices (e.g., touch screen, touch pad, and keyboard). Also, it should be appreciated that other peripheral hardware 414 connected to the I/O controllers 410 may include any type of device, machine, sensor, or component that is configured to communicate with a data processing system.

Additional components connected to various busses may include one or more storage controllers 416 (e.g., SATA). A storage controller may be connected to a data storage device 55 such as one or more storage drives and/or any associated removable media. Also, in some examples, a data store such as an NVMe M.2 SSD may be connected directly to an I/O bus 402 such as a PCI Express bus.

A data processing system in accordance with an embodiment of the present disclosure may include an operating system 418. Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, macOS, and Android operating systems.

The data processing system 400 may also include or be operative to communicate with one or more data stores 55 that correspond to databases 420. The processor 401 may be configured to manage, retrieve, generate, use, revise, and store data, executable instructions, and/or other information described herein from/in the database 420. Examples of a database may include a file and/or a record stored in a relational database (e.g., Oracle, Microsoft SQL Server), which may be executed by the processor 401 or may execute in a second data processing system connected via a network 408.

It should be understood that the data processing system 400 may directly or over the network 408 be connected with one or more other data processing systems such as a server 422 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system. Thus, it is to be understood that when referring to a data processing system, such a system may be implemented across several data processing systems organized in a distributed system in communication with each other via a network.

In addition, it should be appreciated that data processing systems may include virtual machines in a virtual machine architecture or cloud environment that execute the executable instructions. For example, the processor and associated components may correspond to the combination of one or more virtual machine processors of a virtual machine operating in one or more physical processors of a physical data processing system. Examples of virtual machine architectures include VMware ESCi, Microsoft Hyper-V, Xen, and KVM. Further, the described executable instructions may be bundled as a container that is executable in a containerization environment such as Docker.

Also, it should be noted that the processor described herein may correspond to a remote processor located in a data processing system such as a server that is remote from the display and input devices described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In another example, such a client data processing system may execute a web browser or thin client application. Inputs from the user may be transmitted from the web browser or thin client application to be evaluated on the server, rendered by the server, and an image (or series of images) sent back to the client data processing system to be displayed by the web browser or thin client application. Also, in some examples, the remote processor described herein may correspond to a combination of a virtual processor of a virtual machine executing in a physical processor of the server.

Those of ordinary skill in the art will appreciate that the hardware and software depicted for the data processing system may vary for particular implementations. The depicted examples are provided for the purpose of explanation only and is not meant to imply architectural limitations with respect to the present disclosure. Also, those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 400 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

As is well understood, the software aspects of the present invention could be stored on virtually any computer readable medium including a local disk drive system, a remote server, internet, or cloud-based storage location. In addition, aspects could be stored on portable devices or memory devices as may be required. The computer 400 generally includes an input/output device that allows for access to the software regardless of where it is stored, one or more processors, memory devices, user input devices, and output devices such as monitors, printers, and the like.

The processor 401 could include a standard micro-processor or could include artificial intelligence accelerators or processors that are specifically designed to perform artificial intelligence applications such as artificial neural networks, machine vision, and machine learning. Typical applications include algorithms for robotics, internet of things, and other data-intensive or sensor-driven tasks. Often AI accelerators are multi-core designs and generally focus on low-precision arithmetic, novel dataflow architectures, or in-memory computing capability. In still other applications, the processor 401 may include a graphics processing unit (GPU) designed for the manipulation of images and the calculation of local image properties. The mathematical basis of neural networks and image manipulation are similar, leading GPUs to become increasingly used for machine learning tasks. Of course, other processors or arrangements could be employed if desired. Other options include but are not limited to field-programmable gate arrays (FPGA), application-specific integrated circuits (ASIC), and the like.

The computer 400 also includes communication devices that may allow for communication between other computers or computer networks, as well as for communication with other devices such as machine tools, work stations, actuators, controllers, sensors, and the like.

The hybrid system 60 of FIG. 2 operates in one of two phases: a training phase 70 and a deployment phase 75. In the training phase 70 (left side of FIG. 2), the edge devices 50 (FIG. 1) collect data directly or from the field bus and upload that data to Mindsphere, another cloud storage system, a local hard drive, a server, or any other suitable data storage media 55. Once collected, a computer program or application including an algorithm analyzes the data to extract the baseline patterns which are then typically stored in the same data storage system 55 as the collected data.

The computer 400 can send the patterns associated with the corresponding edge devices 55 to the edge devices 55 for monitoring. The edge devices 55 can compute the results and monitor the devices it has access to and can upload the data and results to the data storage device 55. The data storage device 55 and computer 400 can also compute the results for the overall system 10 if desired. The data storage device 55 and computer 400 can also receive data from similar ICSs 10 to increase the data diversity used in training and the efficiency of the operating system. It should also be noted that for training purposes, it is assumed that the system or application 60 receives valid training data and is well protected from cyberattacks or data that represents or includes results of cyberattacks.

To make the application 60 more scalable, the first step of training 70 is to divide the whole ICS 10 into subsystems based on their interdependencies. This task can be achieved through correlation analysis, which is time consuming and data inefficient. An alternative approach is to gather inputs from a domain expert 80 to significantly reduce the effort for this process. For each subsystem identified, three major components or databases 85, 90, 95 are constructed, with each of the three components 85, 90, 95 describing a specific system pattern.

A fast time series pattern extraction and query algorithm records all the patterns in the training data set to define the first major component or database 85. For example, the application can be used to extract all the symbolic patterns for the time series data. The algorithm used can be univariate or multivariate. Many of the process variables in ICSs 10 describe repetitive control patterns that produce repetitive patterns. A limitation of traditional statistics-based time series analysis, such as an autoregressive model, requires the time series to be stationary, which is not entirely true in ICSs 10. For example, when operating a laser cutting machine for batch production, the time interval between the finishing time of a current job and the arrival time of the next material might not be the same. However, when the machine receives the material, it will perform the same operation for the same batch. A pattern extraction algorithm can detect the repetitive patterns and store them in the first component or database 85 in the data storage device 55.

A clustering-based anomaly detection algorithm determines the partitions in the training data set to define the second major component or database 90. The clustering algorithm treats the process data at each time point as one sample. The dimensionality of the sample is the number of process variables. For example, a k-means algorithm or DBSCAN algorithm segments all the training data with a certain number of clusters. One class-based anomaly detection algorithm requires that the data are all generated from the same distribution, however, it is not the case in ICSs 10, which comprise multiple states and cannot be included in a single class. Clustering-based algorithms can handle this issue by defining an appropriate number of states and allocating each data point to a cluster.

A correlation algorithm monitors the cross correlation between variables. This algorithm finds the pairwise correlated process variables in the whole system and defines the third major component or database 95.

As noted earlier, the data used to train or develop the three major components 85, 90, 95 is preferably actual operating data from the ICS 10 itself or similar ICSs 10 and does not include any data indicative of a cyberattack or other anomalies. In other words, the data used is preferably clean operating data indicative of normal operation of the ICS 10.

To implement the application 60, the three major components 85, 90, 95 are first trained on the historical normal operation data as just described. After the training process 70, the three databases 85, 90, 95 are generated: the time series pattern database 85 for the normal operations; clustering centers database 90 for the sample distribution within each cluster; and the database of all the correlated process variables 95 and their corresponding time lags. Each of the databases 85, 90, 95 is stored in the data storage media 55 and is accessible by the computer 400 and the application 60 as needed.

When the application 60 is implemented after training 70, the three major components (represented by three databases 85, 90, 95) work collaboratively to monitor the behavior of the overall ICS 10 or ICSs 10 to which the application 60 is assigned.

In the deployment phase 75, an interval of time series data is captured using a sliding window and the data for that sliding window is compared to the data pattern in the time series pattern database 85. If the captured data shows a pattern that deviates from the time series pattern database, the system 60 will raise an alarm and provide information indicative of the anomalous process variable and the reason for the alarm. In some constructions, this process takes place mainly in the edge devices 50. In addition, it should be noted that not all detected deviations trigger an alarm. Rather, some variability is allowable and only deviations of a certain magnitude trigger alarms. The magnitude required to trigger an alarm may vary from variable to variable such that a deviation of ten percent for one variable may not trigger an alarm while another variable may trigger an alarm if the deviation is more than one percent.

The second major component 90 includes a clustering-based analysis. Data is assigned to various clusters based on the training. Operating data is then used to extract certain measurements that describe the likelihood that those points are drawn from the corresponding clusters. If the likelihood that the new data fits within the predefined clusters is low, the system 60 can raise an alarm. Moreover, the system 60 will calculate the distance to the closest cluster center and identify the features that contribute mostly to the deviation. This process preferably takes place in either the edge devices 50 or the computer 400. The edge devices 55 monitor the devices to which they have access while the computer 400 can monitor any device associated with the ICS 10. Thus, the computer 400 is used to monitor devices across different edge devices 50.

The third major component 95 includes correlation analysis between recorded pairs. In the correlation analysis, the training data is used to identify correlating pairs of variables. For example, the frequency output of an electrical generator is directly related to the rotational speed of the generator. Thus, a one-to-one correlation of speed and frequency would be stored as a correlation pair. The correlation pairs are calculated using operating data and that data is compared to the information within the correlation database 95. If any correlation deviates from the baseline correlation value in the database 95, the system 60 can raise an alarm. This process takes place in either edge devices 50 or the computer 400. The edge devices 50 can monitor the devices to which it has access and the computer 400 can monitor devices that are not monitored by a common edge device 50 across the entire ICS 10. In addition, it should be noted that not all deviations detected in the clustering analysis or the correlation analysis trigger an alarm. Rather, some variability is allowable and only deviations of a certain magnitude trigger alarms. The magnitude required to trigger an alarm may vary from cluster to cluster or across different correlation pairs such that a deviation of ten percent for one situation may not trigger an alarm while another situation may trigger an alarm if the deviation is more than one percent.

If an anomaly or a cyberattack is detected, that data can be fed back into the program 60 to further train the program 60 to quickly recognize the attack should it occur again in the future. In addition, the data could be used to train other systems to aid them in quickly detecting the attack. It should be noted that the data and process described above is generally enough to detect most process anomalies but may not be able to associate the anomaly with a cybersecurity event. To determine if the anomaly is a cyberattack, the system correlates the output data with security events collected from an external IDS (or anomaly detection) system sitting on the same network. This security correlation step is a last step where security only data is fused or merged in the correlation process in order to distinguish pure process anomalies (e.g. a faulty sensor or actuator) from events originated as a consequence of a cybersecurity event. In order to do so, both, temporal and special correlation can be used with additional data sources such as security event logs (e.g. firewall logs, operating system logs), network communication metadata, endpoint security logs (e.g. EDR agent logs, host-based firewall logs), security events from network IDS/IPS/behavioral detection appliances, IIoT/embedded device logs (e.g. PLC diagnostic buffer and security event logs), DCS/control system event logs (e.g. engineering logs, HMI logs), and the like.

Hybrid models 60 provide both temporal pattern and correlation-based information about the ICS system 10. In order for a cyberattack to be successful, an attacker must bypass several detectors which increases the difficulty and the likelihood of being detected. Specifically, the hybrid system 60 provides a mixed detection such that a successful attack needs to bypass each detection mechanism or database 85, 90, 95 and each mechanism works independently of the others. Another advantage of using the hybrid model 60 is that the application 60 provides multiple views of the system 10 and could be used for further analysis based on domain knowledge.

In one example, an attack scenario causes a single sensor 30 to not behave correctly according to the correlation analysis. In this example, there are two possible causes of the sensor behavior. The sensor 30 or communication link between the controller and the sensor 30 is compromised or has failed, or the actuator 25 or other device monitored by the sensor 30 is compromised or has failed.

With the cluster analysis alone, it is difficult to decide which of the possible causes of the measured sensor behavior is the actual cause. However, using the application of FIG. 2, correlation analysis and time series patterns can provide additional information about this sensor 30. Specifically, the application 60 determines if the actuator 25 associated with the sensor 30 is still maintaining a stable correlation with the sensor 30, but the time series pattern has changed. If this is the case, then the sensor 30 is reflecting the correct information about the actuator 25 and it is highly possible that the actuator 25 has been attacked or has failed. If on the other hand, the correlation between the actuator 25 and the sensor 30 has changed significantly, while the actuator behavior appears normal from the perspective of the time series, then it is highly possible the sensor 30 has been attacked or has failed. This analysis could be performed manually by the domain expert 80 or the computer 400 could perform the analysis using a reasoning rule engine.

The application 60 doesn't require adversarial samples (e.g., known cyberattacks) to build or train the monitoring system. Thus, the application 60 is capable of detecting previously unseen or unknown cyberattacks with a reduced likelihood of false alarms by combining results from different model outputs.

In addition, the application 60 provides interpretable results which can be used for action items performed by operators, who may not have IT security domain knowledge (for instance, gas turbine operators in power plants). The application 60 is more robust compared to a single method-based anomaly detection algorithm and makes it harder for hackers to attack the ICS 10 without being detected.

Another advantage of the application 60 is the ability to recognize and extract patterns that can provide precise information about the anomaly. For example, a particular anomaly may have a specific effect on multiple sensors 30. This pattern can be stored and immediately recognized if it occurs again. The immediate recognition would identify the cause of the anomaly more quickly than other monitoring techniques.

This is an unsupervised method which assumes the system 60 has not received any information regarding potential attacks during the training phase 70. Clustering analysis, time series pattern mining and correlation analysis only extract patterns from normal operations. Similar to the idea of an ensemble method, which increase the overall model performance by combining the results from multiple models, output from one model 85, 90, 95 of the hybrid application provides complementary information to other models 85, 90, 95. Therefore, any attacks that deviate from the baseline patterns, including a compromised sensor 30 sending wrong information, or actuator 25 executing the malicious command, can raise an alarm.

Time series pattern matching can point out which sensor 30 or actuator 25 is causing the alarm; clustering analysis can find the major factors that cause the deviation; correlation analysis discovers the deviated pairs. Combined interpretation can provide additional information for logic reasoning and root cause analysis.

Time series pattern mining can be implemented in an edge device 50 and thus the system 60 would continue to work even if the communication between the edge devices 50 and the computer 400 is disrupted. Moreover, combining results from multiple methods 85, 90, 95 can also increase the robustness of the system 60.

ICSs 10 might not be stationary and only the pre-programmed actions will reflect repetitive patterns. Compared to time series analysis methods, which assumes stationary, pattern extraction-based methods don't assume stationary and only extract the repetitive patterns for monitoring purpose.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of protecting an industrial system from cyberattacks, the method comprising:
    collecting initial operating data from a plurality of sensors each positioned within the industrial system and operable to monitor an operating parameter of the industrial system;
    analyzing the initial operating data to develop a program that includes a time-series database including expected operating ranges for each operating parameter, a clustering-based database that includes clusters of operating parameters having similarities, and a correlation database that includes pairs of operating parameters that show a correlation in their initial operating data;
    operating the program including the time-series database, the clustering-based database, and the correlation database in a computer, the program operable to receive current operating data and to analyze that operating data in view of each of the time-series database, the clustering-based database, and the correlation database; and
    triggering an alarm in response to the analysis of the current operating data indicating at least one of an operating parameter outside of an expected range, a change in the expected clustering, and a variation in a correlation.

2. The method of claim 1, wherein the industrial system includes a plurality of edge devices each arranged to collect data from a portion of the plurality of sensors, each edge device operable to communicate with the program to deliver the current operating data from its respective portion of the plurality of sensors.

3. The method of claim 2, wherein each edge device includes the time-series database and each edge device operates to analyze the current operating data received by that edge device to determine if any measured operating parameter is outside of an expected range.

4. The method of claim 3, wherein each edge device includes the correlation database and each edge device operates to analyze the current operating data received by that edge device to determine if any pair of measured operating data deviates from the known correlations in the correlation database.

5. The method of claim 4, wherein each edge device includes the clustering-based database and each edge device operates to analyze the current operating data received by that edge device to determine if any of the measured data deviates from the known clusters in the clustering-based database.

6. The method of claim 1, wherein triggering the alarm includes indicating the most deviated operating parameter and a time frame for the deviation in response to the detection of the operating parameter outside of the expected range.

7. The method of claim 1, wherein triggering the alarm includes indicating the most deviated operating parameters in response to the detection of the change in the expected clustering.

8. The method of claim 1, wherein triggering the alarm includes indicating the most deviated operating parameter pairs in response to the detection of the variation in the correlation.

9. The method of claim 1, wherein the initial operating data is known to be free of any data effected by a cyberattack.

10. The method of claim 1, further comprising a correlation database for the storage of detected security events.

11. The method of claim 10, further comprising correlating the security events in the correlation database with and detected alarms to determine if a detected anomaly is related to a security attack rather than to a process control anomaly.

12. A non-transitory computer readable medium encoded with processor executable instructions that when executed by at least one processor, cause the at least one processor to carry out a method for protecting an industrial system from cyberattacks according to claim 1.

13. A system for monitoring an industrial system for cyberattacks, the system comprising:
    an industrial control system including a plurality of actuators, a plurality of sensors each arranged to measure one of a plurality of operating parameters, and an edge device;
    a computer including a data storage device having stored thereon a program that includes each of a time-series database including expected operating ranges for each operating parameter, a clustering-based database that includes clusters of operating parameters having similarities, and a correlation database that includes pairs of operating parameters that show a correlation; and
    an alarm system operable to initiate an alarm in response to current operating data including a measurement from one of the plurality of sensors falling outside of an expected range, a change in the expected clustering of one of the plurality of sensors based on the current operating data from each of the plurality of sensors, and a variation in the current operating data between two of the plurality of sensors that falls outside of an expected correlation of the two of the plurality of sensors.

14. The system of claim 13, wherein the data storage device includes initial operating data collected by the plurality of sensors and wherein the computer analyzes the initial operating data to populate the time-series database, the clustering-based database, and the correlation database.

15. The system of claim 14, wherein the initial operating data is known to be free of any data effected by a cyberattack.

16. The system of claim 13, wherein the edge device is one of a plurality of edge devices, and wherein each edge device is arranged to collect data from a portion of the plurality of sensors, each edge device operable to communicate with the computer to deliver the current operating data from its respective portion of the plurality of sensors.

17. The system of claim 16, wherein each edge device includes the time-series database and each edge device operates to analyze the current operating data received by that edge device to determine if any measured operating parameter is outside of an expected range.

18. The system of claim 17, wherein each edge device includes the correlation database and each edge device operates to analyze the current operating data received by that edge device to determine if any pair of measured operating data deviates from the known correlations in the correlation database.

19. The system of claim 18, wherein each edge device includes the clustering-based database and each edge device operates to analyze the current operating data received by that edge device to determine if any of the measured data deviates from the known clusters in the clustering-based database.

20. The system of claim 13, wherein the alarm includes an indication of the most deviated operating parameter and a time frame for the deviation in response to the detection of the operating parameter outside of the expected range.

* * * * *